United States Patent Office 3,401,615
Patented Sept. 17, 1968

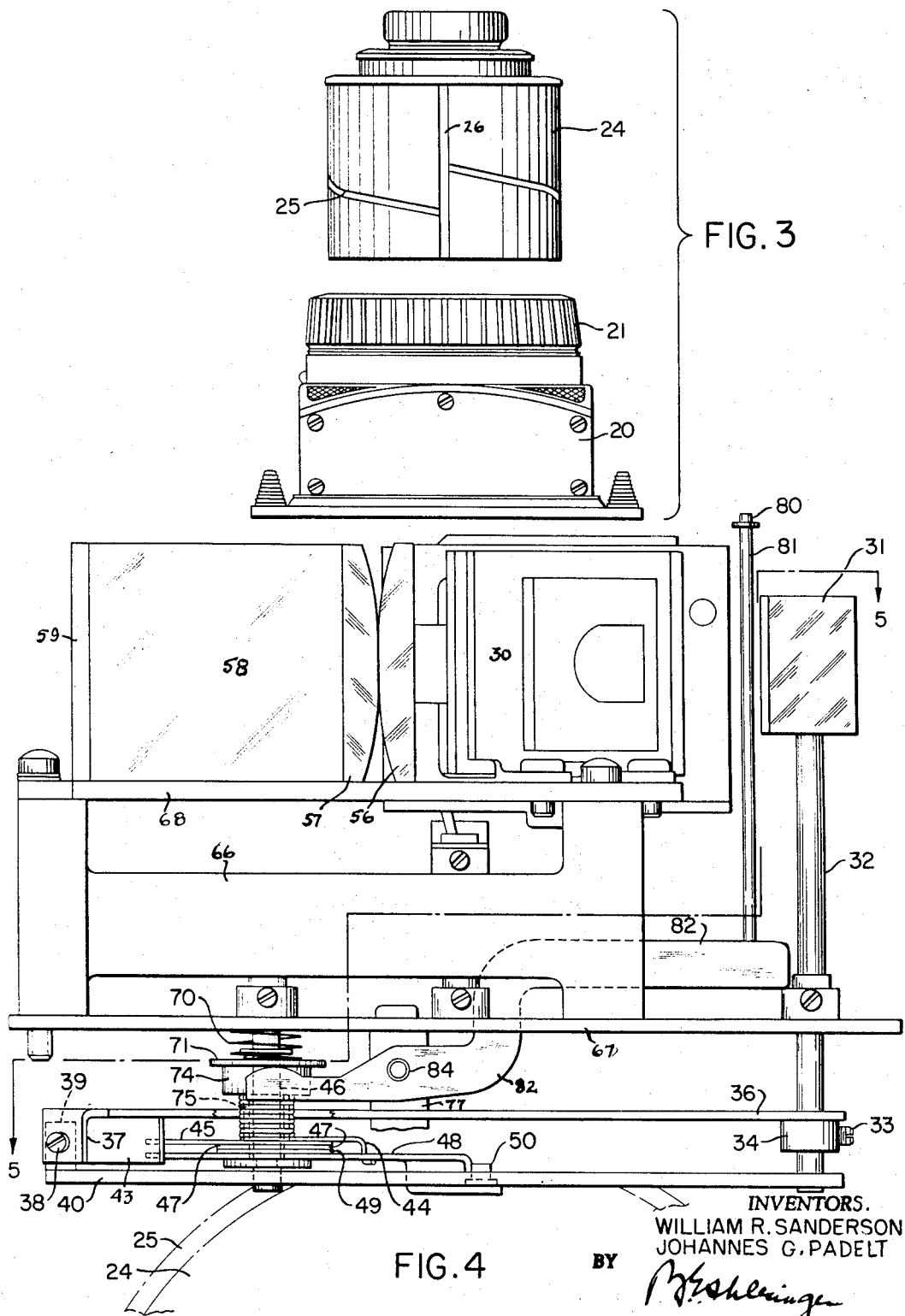

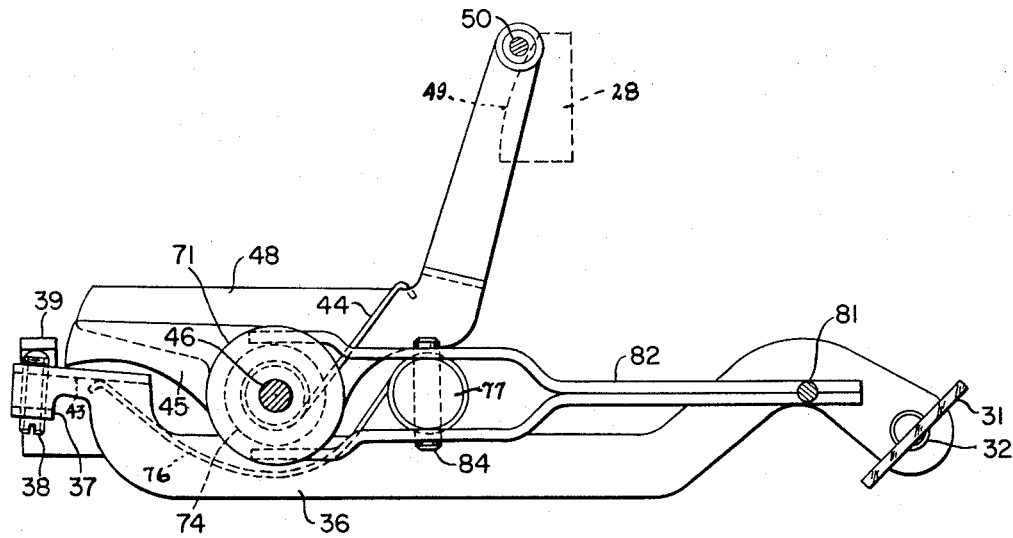

3,401,615
PHOTOGRAPHIC CAMERA
William R. Sanderson, Irondequoit, and Johannes G. Padelt, Rochester, N.Y., assignors to Graflex, Inc., Rochester, N.Y., a corporation of Delaware
Filed July 19, 1965, Ser. No. 472,935
5 Claims. (Cl. 95—44)

ABSTRACT OF THE DISCLOSURE

Each objective lens for the camera carries a cam for operating the rangefinder system. A first lever carries a follower adapted to engage the cams. A second lever engages a third lever which carries at one end the mirror of the rangefinder system and at its other end a screw which engages a fixed infinity stop. A spring urges the screw toward engagement with the stop. A second spring interposed between the first and second levers urges the follower toward engagement with the lens cam, and the second lever toward engagement with the third. A friction coupling releasably connects the first and second levers. When this coupling is released, the second spring moves the first and second levers apart to engage the follower with the cam, or the first spring engages the screw with the stop forcing the second lever toward the first, depending on whether screw or follower is disengaged. The screw permits setting the rangefinder system to infinity prior to inserting a lens in the camera.

---

The present invention relates to photographic cameras, and more particularly to rangefinders for such cameras. In a still more specific aspect, the invention relates to a photographic camera for use with interchangeable lenses.

One disadvantage of conventional rangefinders for photographic cameras is that the different lenses used with such cameras, such as wide angle, normal angle, and telescopic, have to have different amounts of focusing (lens travel), and each time that a different lens is mounted on the camera the infinity point of the lens has to be positioned with reference to the mechanism operating the rangefinder precisely within a small tolerance.

One object of this invention is to provide a camera with a rangefinder system which has a fixed infinity point, so that the focusing adjustments are identical for all the different types of lenses that may be employed with the camera.

Another object of the invention is to provide a rangefinder system for photographic cameras which will eliminate adjustment of the infinity point when one type lens is substituted in a camera for another.

Another object of the invention is to provide a photographic camera having a rangefinder system with which many of the requirements, heretofore necessary, for precision in the rangefinder and camera set-up are eliminated.

Another object of the invention is to provide a photographic camera having a rangefinder system of the character described with which nevertheless high rangefinder precision can be achieved.

Another object of the invention is to provide a rangefinder system for photographic cameras which will permit uniform focusing movement for all lenses.

A concomitant object of the invention is to provide a rangefinder actuating mechanism with which a single focusing mount can be used for different lenses of different focal lengths.

Other objects of the invention will be apparent hereinafter from the specification and from the recital of the appended claims, particularly when read in connection with the accompanying drawings.

In the drawings:

FIG. 3 is an exploded view, showing the camera housing and a lens barrel but with the lens barrel removed from the housing;

FIG. 4 is a view on a very much enlarged scale and with the camera housing or casing removed, showing parts of the rangefinder in rear elevation, parts also being broken away;

FIG. 5 is a section on the line 5—5 of FIG. 4; and

FIG. 6 is a diagrammatic view of the optical layout of the viewfinder rangefinder system of the camera.

Figure 1:
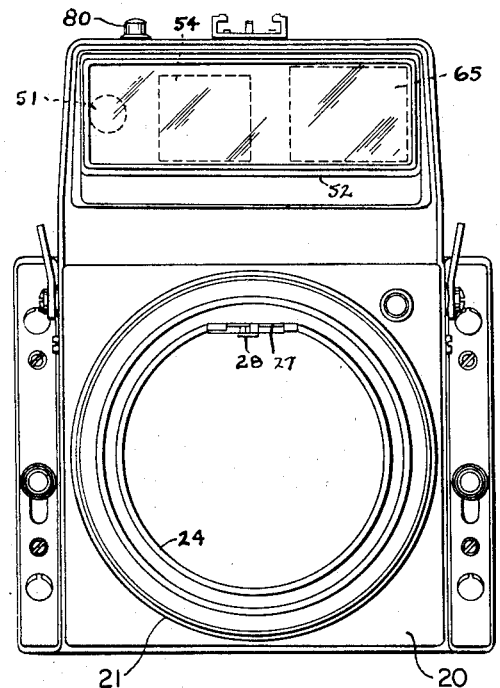
FIG. 1 is a front elevation of a camera equipped with a rangefinder mechanism constructed according to this invention but without a lens in the camera.

Referring now to the drawings by numerals of reference, 20 denotes the camera housing, which here is similar to the camera housing illustrated in the Padelt U.S. patent application Ser. No. 349,407, filed Feb. 26, 1964. This camera housing is provided at its front with a conventional lens focusing mount comprising a ring 21 having a conventional footage scale and a knurled peripheral surface for rotating the mount to effect focusing. The mount is adapted to receive interchangeably any one of a series of focusing barrels 24 (FIG. 3) which may carry, respectively, different lenses, normal, wide angle, telescopic, etc., with between-the-lens type shutters. The lens barrel 24 is provided with a peripheral helical groove 25 adapted to be engaged by a pin on the focusing ring 21 to effect in and out adjustment of the barrel for focusing upon rotation of the ring. A pin (not shown) engages, as is conventional in the longitudinal groove 26 in the barrel to hold the barrel against rotation during rotation of the focusing ring.

Each lens barrel also has a flat 27 (FIG. 1) on its inside surface to which there is secured a cam 28 (FIGS. 1 and 5) for operating the rangefinder mechanism. The cam 28 is secured in the lens barrel to extend in the general direction of the axis of the barrel. This cam is different for each lens.

The rangefinder system includes a fixed semitransparent mirror 29 (FIG. 6), a mirror 30 having a hole in the middle for passage of the rangefinder rays, and a pivoted mirror 31. The pivoted mirror 31 is mounted upon a post 32 (FIG. 4) which is secured by a screw 33 to the hub 34 which is soldered or brazed or otherwise secured to a lever 36 (FIGS. 4 and 5) that is formed with a downturned lug 37 at its free end in which a screw 38 is threaded.

The screw 38 engages a ledge 39 that extends upwardly from the base plate 40 of the rangefinder mechanism. This ledge 39 acts as an infinity stop as will be described further hereinafter.

A lever 45, which is pivoted at one end upon a stud 46, that is secured in the plate 40, engages at its free end with the flange 43 turned down from the lever 36 at the opposite side from and parallel to lug 37. The lever 45 is resiliently held in engagement with the lug 43 by a coil spring 44 which is wound tight on the hub of the lever 45, and whose free end engages one arm of a lever 48. This lever 48 is also pivotally mounted on the stud 46. It carries at its free end a pin 50 which engages against the cam surface 49 of the cam 28 of the lens which is at the time mounted in the camera. As the focusing ring 21 is rotated in focusing, the lens barrel 24 moves axially forwardly or rearwardly, depending upon the direction of rotation of the focusing ring; and the cam 28 moves with it. Pivotal movement is thus imparted to the lever 36 and to the mirror 31 carried thereby, as will be described further hereinafter.

The mirror 31 is aligned with an opening 51 in the front cover 52 of the rangefinder mechanism. As stated, it cooperates with the mirror 30, and with the semitransparent mirror 29, which is formed on the inclined surface of prism 59. Mirror 30 is aligned with another opening in the cover 52 and with a parallax correction mask 53 which is mounted in this opening to be shifted laterally and downwardly. This mask may perform the same general function as the parallax compensating mask shown in the patent to Steiner et al., No. 2,888,868, granted June 2, 1959. However, it is provided with a series of openings 54 through which light rays may be admitted to the mirror 30. It may be coupled to the focusing cam through a mechanism similar to that described in the Patent No. 2,888,868.

Rays of light transmitted from the two mirrors pass through the field lens 55, which is mounted centrally in the floating frame lenses 56 and 57, and are transmitted by the contacting prisms 58 and 59, and the semitransparent mirror 29, and through the positive eye lens 60 to the eye of the observer. Lens 60 is mounted in a ring 62 in the back cover plate 64 of the rangefinder mechanism housing. A negative lens 65 disposed in a suitable opening in the front cover plate of the rangefinder mechanism serves with the mask 53 and the eyepiece lens 60 to form a viewfinder for the camera. The mask has the openings 54 through which the light rays pass to the mirror 30, and compensates for parallax.

A frame 66 (FIG. 4), which is supported by a plate 67 above the levers 36, 45, 48, in turn carries the plate 68 upon which the prisms 58 and 59 and their cooperating lenses of the viewfinder-rangefinder system are mounted.

One of the features of the invention is that all lenses used in the camera can be brought to the same infinity position and have the same amount of adjustment during focusing. For this purpose, the lever 45 is made adjustable angularly relative to the lever 48. These two levers are ordinarily held in engagement to transmit motion from one to the other through the friction discs 47 and 49 (FIG. 4), respectively, which are glued to the two levers and which are resiliently held in engagement by a coil spring 70 that presses on the flange 71 of a spool 74 which engages at its lower end with the upper face of the hub 75 of the lever 45. Upward pressure on the spool 74 will free the levers 45 and 48 so that they may move independently of one another under pressure of spring 44. Stop screw 38 carried by lever 36 is alawys urged toward engagement with stop lug 39 by a spring 76 which presses at one end against ledge 43 of lever 36 and which at its other end is coiled around and fastened to a post 77. When the levers 45 and 48 are freed, spring 44 urges them apart to cause pin 50 to engage the cam 28 of a respective lens, if the angular spread of the levers is not sufficient for pin 50 to engage the cam and for lever 45 to engage simultaneously the ledge 43 of lever 36. On the other hand, if their angular spread is too great, spring 76 will close the gap between the levers 45 and 48. Lever 36 is always urged to a position where its screw 38 engages the lug 39 of the stop plate 40. This is the infinity stop position.

To release the levers 45 and 48 for spread or retraction, a release button 80 (FIG. 4), which is accessible at the top of the rangefinder mechanism housing, is pushed down. This button is integral with or secured to a rod 81 that is reciprocal vertically in the housing, and that engages at its lower end with one end of a lever 82 that is furcated at its other end and is pivoted intermediate its ends upon a stud 84 that is fastened in the post 77. The furcations of the lever 82 are rounded on their upper sides, and engage under the flange 71 of the spool 74. When the release button 80 is pressed down, then, the spool 74 is lifted upwardly against the resistance of the spring 70; and the spring 44 which is wound tight on the hub 75 of the lever 45, and which engages at its free end with the lever 48, moves the lever 48 in a direction to engage the pin 50 with the cam 28 of the lens, or permits this lever to move in a direction to permit such engagement under pressure of spring 76. Thus, any backlash is eliminated in the rangefinder system.

Figure 2:
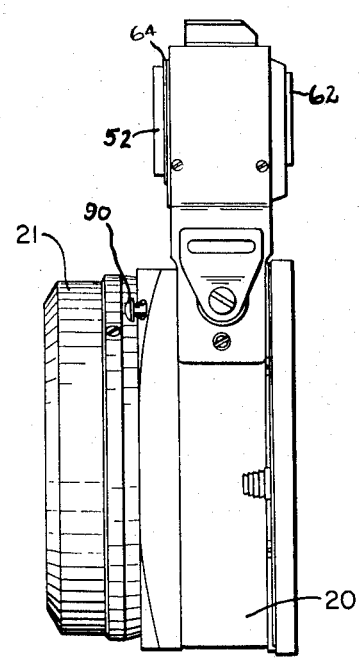
FIG. 2 is a side elevation of this camera again without a lens in place.

To remove a lens from or to insert a lens in the focusing mount 20, the button 90 (FIG. 2) is pushed in. Through a linkage (not shown) this moves lever 48 to cause pin 50 (FIG. 5) to clear the cam 28 attached to the lens barrel.

The rangefinder mechanism of the present application is unique since it is adjusted with a setscrew 38 at infinity position without a lens in place. Then, if a lens is inserted into the camera and turned to its infinity position stop, the coupled levers 45 and 48 will pick up the infinity position on the cam 28. At infinity position pick-up screw 38 of lever 36 engages infinity stop 39, pin 50 engages the cam 28 of the respective lens, and lever 45 must contact lever 36 as shown in FIG. 5. Any backlash in the rangefinder system (due to variations in the location of the cam) may be eliminated if the self-spreading levers 45 and 48 are uncoupled for an instant by depressing the release button 80 (FIGS. 1 and 4).

With the mechanism of the present invention the infinity position of the mirror 31 is set by the setscrew 38 independently of the helical groove 25 of the lens barrel 24 (FIG. 3).

Thus, the rangefinder system of the present invention can be used with a camera with interchangeable lenses having a uniform amount of focusing (lens travel) for the different lenses. This means that one focusing mount may be used for many lenses of different focal lengths.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A photographic camera having a rangefinder system and adapted for use with interchangeable lenses, each of which has a uniform travel for focusing between its infinity and its minimum close-up position and each of which is adjustable axially for focusing and to each of which a cam is secured for actuating said rangefinder system upon adjustment of the respective lens, means for adjusting the rangefinder system to an infinity position comprising a stop lug, means for coupling the cam associated with a respective lens to said rangefinder system, upon mounting the respective lens in the camera, to transmit motion from said cam to said system, said rangefinder system including a movable member, said coupling means comprising a plurality of parts rotatably adjustable relative to one another, one of which parts is engageable with the respective cam and another of which is engageable with said movable member, spring means for biasing said parts relative to one another in a direction to take up all backlash resulting from variations from lens to lens in the location of a cam on its lens, and means biasing said movable member constantly toward engagement with said stop lug.

2. A photographic camera having a rangefinder system and adapted for use with interchangeable lenses, each of which is adjustable axially for focusing and each of which has a cam secured to it that is adapted to operate the rangefinder system upon axial adjustment of the respective lens, an infinity stop on the camera, said rangefinder system including a first lever and means carried by said lever to engage said stop and locate said rangefinder system in the infinity position, and means including a pair of pivoted levers interposed between said first lever and said cam to transmit motion from said cam to said first lever, means releasably coupling said pair of levers to move together, and means constantly biasing the two levers of said pair to pivot them relative to one another when said coupling means is released.

3. A photographic camera having a rangefinder system and adapted for use with interchangeable lenses, each of which is adjustable axially for focusing and each of which has a cam secured to it that is adapted to operate the rangefinder system upon axial adjustment of the respective lens, an infinity stop on the camera, said rangefinder system including a first lever, an adjustable element carried by said first lever to engage said stop and to locate said rangefinder system in infinity position, means for transmitting motion between the cam associated with a respective lens and said first lever comprising a pair of members movable relative to one another, one of which is adapted to be operatively connected to the respective cam, and the other of which is adapted to be operatively connected to said first lever, means for releasably connecting said members to one another to transmit motion from the respective cam to said first lever, manually-operable means for disconnecting said members from one another, means for biasing said members away from one another when they are disconnected, and means for biasing said first lever in a direction to urge said element into engagement with said stop, whereby said members are extended or retracted as may be required to connect said one member with the respective cam and to connect said other member with said first lever.

4. A photographic camera as claimed in claim 3, wherein said members are two levers pivotally connected to one another, the first-named biasing means is a first spring disposed between the two levers and biasing them away from one another when they are disconnected, and the second-named biasing means is a second spring which is stronger than said first spring and is disposed to urge said first lever into engagement with said infinity stop and to operate through said first lever to bias said two levers toward one another when they are disconnected, whereby said members are extended or retracted as may be required to connect said one member with the respective cam and to connect the other member with said first lever.

5. A photographic camera having a rangefinder system and adapted for use with interchangeable lenses, each of which is adjustable axially for focusing and each of which has a cam secured to it that is adapted to operate the rangefinder system upon axial adjustment of the respective lens, a lens mount rotatably mounted in said camera for connection to the respective lenses for axial adjustment thereof upon rotation of said mount, an infinity stop on the camera, said rangefinder system including a first lever, a pick-up member carried by said first lever to engage said stop and to locate said rangefinder system in the infinity position, one of the cooperating members comprising said stop and said pick-up member being adjustable to adjust said infinity position, means for transmitting motion between the cam associated with a respective lens and said first lever comprising a second lever and a third lever, said second lever being mounted pivotally in the camera for contact with said first lever and said third lever being pivotally mounted coaxially of said second lever for contact with the associated cam when a lens is positioned in said lens mount, means for frictionally holding said second and third levers in a selected angular relationship, means for releasing said holding means, a spring disposed between said second and third levers to urge said second and third levers apart when said holding means is released, and a spring urging said first lever into contact with said second lever.

References Cited

UNITED STATES PATENTS 2,467,456  4/1949  Baer _____ 95—44

JOHN M. HORAN, *Primary Examiner.*